(12) United States Patent
Tandon et al.

(10) Patent No.: US 11,184,356 B1
(45) Date of Patent: Nov. 23, 2021

(54) SYSTEM AND METHOD FOR SEAMLESS USER EQUIPMENT AUTHENTICATION

(71) Applicant: Syniverse Technologies, LLC, Tampa, FL (US)

(72) Inventors: Ravi Tandon, Sandweiler (LU); Huiyue Xu, Tampa, FL (US); Himanshu Garg, Bathinda (IN)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 17/219,293

(22) Filed: Mar. 31, 2021

Related U.S. Application Data

(60) Provisional application No. 63/010,896, filed on Apr. 16, 2020.

(51) Int. Cl.
| | | |
|---|---|---|
| *H04W 12/06* | (2021.01) | |
| *G06F 21/43* | (2013.01) | |
| *H04L 29/06* | (2006.01) | |
| *H04L 29/08* | (2006.01) | |
| *H04W 12/03* | (2021.01) | |
| *H04W 12/08* | (2021.01) | |

(52) U.S. Cl.
CPC ...... *H04L 63/0876* (2013.01); *H04L 63/0281* (2013.01); *H04L 67/02* (2013.01); *H04L 67/141* (2013.01); *H04W 12/03* (2021.01); *H04W 12/06* (2013.01); *H04L 2463/082* (2013.01)

(58) Field of Classification Search
None
See application file for complete search history.

(56) References Cited

U.S. PATENT DOCUMENTS

| 10,050,897 | B2 * | 8/2018 | Wang | H04L 43/0888 |
|---|---|---|---|---|
| 2004/0019564 | A1 * | 1/2004 | Goldthwaite | G06Q 20/12 |
| | | | | 705/44 |
| 2012/0084132 | A1 * | 4/2012 | Khan | G06Q 20/3278 |
| | | | | 705/14.26 |

(Continued)

OTHER PUBLICATIONS

Optimization Scheme of CGN Logs. Ma et al. IEEE. (Year: 2012).*

(Continued)

*Primary Examiner* — Venkat Perungavoor
(74) *Attorney, Agent, or Firm* — Andriy Lytvyn; Smith & Hopen, P.A.

(57) ABSTRACT

This invention relates to a method and a system for performing seamless authentication and identification of a mobile subscriber requesting to access a $3^{rd}$ Party Merchant's online platform. The subscriber verification system intercepts a message sent from a first network node to a second network node during a data session establishment procedure. The subscriber verification system extracts a first set of identification values associated with a user equipment (UE) from the intercepted message. After the data session is established, the UE sends an encrypted request to access the Merchant server. The Merchant server identifies a second set of identification values associated with the encrypted request and sends them for validation to the subscriber verification system. The second set of identification values is compared against the first set of identification values. If the two set of identification values match, the UE is authenticated.

32 Claims, 10 Drawing Sheets

(56) References Cited

U.S. PATENT DOCUMENTS

| | | | |
|---|---|---|---|
| 2017/0373953 A1* | 12/2017 | George | H04L 43/04 |
| 2018/0034770 A1* | 2/2018 | Rajagopalan | H04L 41/0806 |
| 2018/0098245 A1* | 4/2018 | Livanos | H04W 28/0289 |
| 2018/0241615 A1* | 8/2018 | Livanos | H04L 12/1407 |

OTHER PUBLICATIONS

A Novel Security System for Preventing DoS Attacks on 4G LTE Networks. Ayyaz. CSREA Press. (Year: 2016).*

3GPP TS 23.501 version 15.2.0 Release 15, 3rd Generation Partnership Project; Technical Specification Group Services and System Aspects; System Architecture for the 5G System; Stage 2, 2018.

3GPP TS 29.060 version 12.6.0 Release 12, 3rd Generation Partnership Project; Technical Specification Group Core Network and Terminals; General Packet Radio Service (GPRS); GPRS Tunneling Protocol (GTP) across the Gn and Gp interface, 2014.

3GPP TS 29.272 version 9.9.0 Release 9, 3rd Generation Partnership Project; Technical Specification Group Core Network and Terminals; Evolved Packet System (EPS); MME and Serving GPRS Support Node (SGSN) related interfaces based on Diameter protocol, 2012.

3GPP TS 23.402 version 15.3.0 Release 15, 3rd Generation Partnership Project; Universal Mobile Telecommunications System (UMTS); LTE; Architecture enhancements for non-3GPP accesses, 2018.

3GPP TS 23.502 version 15.2.0 Release 15, 3rd Generation Partnership Project; 5G; Procedures for the 5G System, 2018.

3GPP TS 33.501 version 15.4.0 Release 15, 3rd Generation Partnership Project; 5G; Security architecture and procedures for 5G System, 2019.

3GPP TS 33.517 version 16.1.0 Release 16, 3rd Generation Partnership Project; 5G; 5G Security Assurance Specification (SCAS) for the Security Edge Protection Proxy (SEPP) network product class, 2020.

Belshe, et al., Hypertext Transfer Protocol Version 2 (HTTP/2), Internet Engineering Task Force (IETF RFC 7540), May 2015.

Fajardo, et al., Diameter Base Protocol, Internet Engineering Task Force (IETF RFC-6733), Oct. 2012.

Codeception—REST module get/set cookie(s)—Stack Overflow, REST module get/set cookie(s), https://stackoverflow.com/questions/36334244/rest-module-get-set-cookies/36335651, accessed Jul. 9, 2021.

3GPP TS 23.203 version 11.7.0 Release 11, 3rd Generation Partnership Project; Digital cellular telecommunications system (Phase 2+); Universal Mobile Telecommunications System (UMTS); LTE; Policy and charging control architecture, 2012.

Oracle ATG Web Commerce—Starting the REST module, ATG Web Services and Integration Framework Guide, https://docs.oracle.com/cd/E24152_01/Platform.10-1/ATGWSFrameGuide/html/s1302startingtherestmodule01.html, accessed Jul. 9, 2021.

REST module, Confluence Server Developer, https://developer.atlassian.com/server/confluence/rest-module/, accessed Jul. 9, 2021.

* cited by examiner

SYSTEM AND METHOD FOR SEAMLESS USER EQUIPMENT AUTHENTICATION

PRIORITY CLAIM

This non-provisional patent application claim priority to the U.S. Provisional Application No. 63/010,896 filed on Apr. 16, 2020.

BACKGROUND OF THE INVENTION

1. Field of the Invention

This invention relates generally to the field of telecommunications networks. More specifically, the invention pertains to a seamless multi-factor authentication by performing mobile subscriber identification.

2. Brief Description of the Related Art

GPRS Tunneling Protocol (GTP) is a protocol defined in $3^{rd}$ Generation Partnership Project (3GPP) TS 29.060 (3rd Generation Partnership Project; Technical Specification Group Core Network and Terminals; General Packet Radio Service (GPRS); GPRS Tunneling Protocol (GTP) across the Gn and Gp interface). It is used to carry mobile data traffic between Serving GPRS Support Node (SGSN) and Gateway GPRS Support Node (GGSN) in 2.5G/3G networks, and between Serving Gateway (SGW) and Packet Data Network Gateway (PGW) in (Long Term Evolution) LTE networks.

Hyper Text Transfer Protocol version 2 (HTTP/2) is described in IETF RFC 7540 and is used in 5G service-based interfaces. Such interfaces use HTTP/2 protocol with Java Script Object Notation (JSON) as the application layer serialization protocol. For the security protection at the transport layer, 3GPP Network Functions (NFs) support Transfer Layer Security (TLS). TLS is used within a Public Land Mobile Network (PLMN), if network security is not provided by other means, as specified in 3GPP TS 33.501 (3rd Generation Partnership Project; Technical Specification Group Services and System Aspects; Security architecture and procedures for 5G system). TLS is used to carry mobile signaling traffic between NFs in 5G core networks, more specifically between Access and Mobility Management Function (AMF) and Session Management Function (SMF), and toward 5G-Equipment Identity Register (5G-EIR), as defined in 3GPP TS 23.501 (3rd Generation Partnership Project; Technical Specification Group Services and System Aspects; System Architecture for the 5G System; Stage 2) and TS 23.502 (3rd Generation Partnership Project; Technical Specification Group Services and System Aspects; Procedures for the 5G System; Stage 2).

The Security Edge Protection Proxy (SEPP) is a network element specified in 3GPP TS 33.501 (3rd Generation Partnership Project; Technical Specification Group Services and System Aspects; Security architecture and procedures for 5G system) and 3GPP TS 33.517 (3rd Generation Partnership Project; Technical Specification Group Services and System Aspects; 5G Security Assurance Specification (SCAS) for the Security Edge Protection Proxy (SEPP) network product class). SEPP is used to protect control plane traffic that is exchanged between different 5G PLMNs. The functions that SEPP performs include message filtering, policing, and topology hiding for all Application Program Interface (API) messages.

Diameter is an AAA (Authorization, Authentication and Accounting) protocol specified in RFC-6733 (Diameter Base Protocol). Diameter protocol works at the application layer in Open System Interconnection (OSI) model over Transmission Control Protocol (TCP)/Stream Control Transmission Protocol (SCTP) or TLS (for security) protocol. Diameter is a message-based protocol, in which network nodes exchange request and response messages with one another. Diameter can be used over S13/S13' interface as defined in 3GPP TS 29.272 (3rd Generation Partnership Project; Technical Specification Group Core Network and Terminals; Evolved Packet System (EPS); Mobility Management Entity (MME) and Serving GPRS Support Node (SGSN) related interfaces based on Diameter protocol).

Trusted WLAN Access Gateway (TWAG) and Evolved Packet Data Gateway (ePDG) nodes are specified 3GPP TS 23.402 (3rd Generation Partnership Project; Technical Specification Group Services and System Aspects; Architecture enhancements for non-3GPP accesses). TWAG enables user equipment (UE) to connect to a PGW via a trusted Non-3GPP network over S2a interface, while and ePDG enables the UE to connect to a PGW via an untrusted Non-3GPP network over S2b interface respectively.

Merchants and Enterprises are required to perform User Authentication to provide online services to a UE. Such authentication is commonly accomplished using conventional methods such as HTTP Header Enrichment, or HTTP Redirection to authentication servers, or sending One-Time-Passwords (OTP) to designated user equipment. These methods have security flaws because HTTP is not secure, and OTP can be sniffed or hacked.

Conventionally, Seamless Authentication is built on header enrichment, which is an antiquated technology that requires the use of HTTP and cannot support secured HTTP (HTTPS). As stated above, HTTP lacks security of HTTPS. In the future, it is possible that ANDROID and IOS may completely prevent the use of the HTTP in native mobile applications, thereby making HTTP header enrichment obsolete. If HTTP support is deprecated by leading device operating systems and web browser platforms including ANDROID, IOS, GOOGLE CHROME, FIREFOX etc, HTTP redirection to cloud-based authentication servers would not be a viable workaround.

Another, usual approach of using OTP to perform UE authentication has a known security risk as it can be sniffed or hacked, thereby undermining the security of UE authentication.

Thus, what is needed is a method and system for seamless and secure UE authentication.

SUMMARY OF THE INVENTION

This invention pertains to a novel and nonobvious subscriber verification system for performing seamless authentication and subscriber identification. The subscriber verification system is independent of underlying protocol and access and core network technology being used. The subscriber verification system provides an improved user experience because subscriber is not asked to feed any OTP. Furthermore, the subscriber identification system does not rely on unsecured HTTP header enrichment and redirection.

For implementation on 3G/4G networks, the subscriber verification system maintains mappings among subscriber's Mobile Station International Subscriber Directory Number (MSISDN), International Mobile Subscriber Identity (IMSI), International Mobile Equipment Identity (IMEI) and Location parameters. Upon detecting a change in these mappings, subscriber verification system alerts the party whose server UE is requesting to access (herein, referred to as Merchant) so that that party can trigger its own strict authentication mechanisms, such as email-based confirmation, passwords, or grid validations. For implementation on a 5G network, the subscriber verification system maintains mappings of Generic Public Subscription Identifier (GPSI), Subscription Permanent Identifier (SUPI) and Permanent Equipment Identifier (PEI) information, which are 5G equivalents of MSISDN, IMSI and IMEI.

In an embodiment, the invention pertains to a method and system configured to perform mobile subscriber identification and authentication in a secure way using GTP-Proxy, S13/S13' client, Traffic Detection Function (TDF), Carrier Grade Network Address Translation (CGNAT) modules for 3G or 4G or Non-3GPP Access for S2a and S2b Traffic and HTTP/2-Proxy, SEPP, SMF-Proxy, UPF-Proxy, N17 client, TDF, CGNAT modules for 5G Traffic.

The subscriber verification system provides an API interface at its Authentication System for $3^{rd}$ Party Merchant server to authenticate its subscriber access in real-time, without relying on conventional and unsecure techniques, such as HTTP Header Enrichment, HTTP Redirection to authentication server, or OTP delivery to a mobile device.

In an embodiment, an Identification System is positioned in MNO's core infrastructure or an IPX cloud on Gn/Gp interface between SGSN and GGSN network nodes for 3G traffic; on S5/S8 interface between SGW and PGW network nodes for 4G traffic; on S2a/S2b interface between TWAG/ePDG and PGW network nodes for Non-3GPP Access based traffic; on N11/N3 interface between AMF and SMF network nodes for non-roaming 5G traffic; on N32/N16/N9 interface between V-SEPP and H-SEPP, V-SMF and H-SMF, and V-UPF and H-UPF network nodes for roaming 5G traffic. The Identification System is configured to capture and store UE's identification information including MSISDN, IMSI, IMEI for 3G or 4G or Non-3GPP over S2a and S2b access, or GPSI, SUPI, PEI for 5G access, and Allocated End User IP Address and User Location Information (ULI) during session establishment.

In an embodiment, the subscriber verification system can be configured to identify and offload Merchant-specific subscriber traffic directly via its CGNAT module, such that source public IP address and the port being used to exchange this traffic with Merchant server is assigned and stored along with session information to make a complete mapping between MSISDN, IMSI, IMEI, (or GPSI, SUPI, PEI), ULI, Allocated End User IP Address, Public IP address and Port information, which can be used to identify the UE in real time.

In an embodiment, the Identification System may comprise an external CGNAT feed handler module in case local CGNAT offload is not permitted by the Mobile Network Operator (MNO). External feed handler enables the Identification System to retrieve public IP address and port information used by MNO's CGNAT, thereby enabling the Identification System to store this information along with MSISDN, IMSI, IMEI, (or GPSI, SUPI, PEI), User Location, and Allocated End User IP Address for further subscriber identification.

Additionally, subscriber verification system can include S13'/S13 and N17 clients, which can be used to communicate with an Equipment Identity Register (EIR) to verify that the UE being used to establish the subscriber session is white-listed.

The Authentication System, upon receiving authenticate request from a $3^{rd}$ Party Merchant server, triggers an identification request to an applicable Identification System, which verifies that MSISDN, IMSI, IMEI (or GPSI, SUPI, PEI) UE identification values being received from Merchant application running on device (or previously stored by the Merchant as part of onboarding or Know Your Customer (KYC) procedure, in case the UE is using a web browser to access the Merchant server), matches the session information to ensure that no information is spoofed or impersonated. The Authentication System can also alert the Merchants if the Authentication System detects any change in MSISDN, IMSI, IMEI, (or GPSI, SUPI, PEI) Location mappings so that the Merchant can trigger its own strict authentication mechanisms, for example email-based confirmation, passwords, or grid validations.

In an embodiment, the invention pertains to a method of authenticating a UE requesting to access a server via a telecommunications network. The method involves the step of intercepting a first message sent from a first network node to a second network node, wherein the first message enables establishment of a data session for the UE. The first network node can be one of the following: a Serving Gateway (SGW), a Serving General Packet Radio Service Support Node (SGSN), a Trusted Wireless Local Area Network Access Gateway (TWAG), an evolved Packet Data Gateway (ePDG), and an Access and Mobility Management Function (AMF). The second network node can be one of the following network nodes: a Packet Data Network Gateway (PGW), a Gateway General Packet Radio Service Support Node (GGSN), and a Session Management Function (SMF).

After the first message is intercepted, a first set of identification values associated with the UE is extracted from the first message and stored in a first database. The first set of identification values associated with the UE can include the following: an International Mobile Subscriber Identity (IMSI), a Mobile Station International Subscriber Director Number (MSISDN), an International Mobile Equipment Identity (IMEI), an Internet Protocol (IP) address, a Generic Public Subscription Identifier (GPSI), a Subscription Permanent Identifier (SUPI), and a Permanent Equipment Identifier (PEI). After the first set of identification values is extracted from the first message, the first message is forwarded to the second node.

After the data session is established, the UE sends an encrypted request to access a server. The encrypted request can be sent using a Hypertext Transfer Protocol Secure (HTTPS). The encrypted request is forwarded to the server. Responsive to receiving the encrypted request, the server obtains a second set of identification values associated with the UE. The second set of identification values can be included with the encrypted request. Alternatively, the server can obtain the second set of identification values based on user credentials provided in the encrypted request, wherein the second set of identification values has been previously stored during an onboarding procedure or a Know Your Customer (KYC) procedure.

Upon receipt of the encrypted request, the server sends a validation request to validate that the second set of identification values is associated with a legitimate subscriber. The validation request includes a public IP address and a port number from which the server received the encrypted request. The first set of identification values associated with the public IP address and the port number is retrieved from the first database. The second set of identification values received in the validation request from the server is compared against the first set of identification values stored in the first database. If the second set of identification values matching the first set of identification values, an authentication confirmation is sent to the server.

In an embodiment, the UE sends the encrypted request using an application installed on the UE. In this scenario, the second set of identification values associated with the UE (which may include a MSISDN, an IMEI, an IMSI, an IP address, a GPSI, a SUPI, a PEI) is provided with the encrypted request. Alternatively, the UE can send the encrypted request using a web browser installed on the UE. In this scenario, the encrypted request user credentials—for example, username and password—which enable the server to obtain the second set of identification values previously collected during an onboarding or KYC procedure.

The public IP address and the port number from which the server receives the encrypted request can be assigned by a Carrier-Grade Network Address Translation (CGNAT) module or retrieved by a CGNAT feed handler from the telecommunications network. In an embodiment, the CGNAT module can be used to offload the encrypted request directly to the server, bypassing the second network node.

In an embodiment, a request can be sent to an Equipment Identity Register (EIR) to validate a IMEI or a PEI associated with the UE to confirm that the UE has not been blacklisted.

Depending on the type of telecommunication network with which the method is implemented, the first message may be intercepted using a GPRS Tunneling Protocol (GTP) Proxy, a Hypertext Transport Protocol/2 (HTTP/2) Proxy, a Security Edge Protection Proxy (SEPP) Proxy, or a Session Management Function (SMF) Proxy.

In an embodiment, the first set of identification values associated with the UE is stored in a second database. If there is a change in one or more identification values relative to a previous session of the UE, an alert can be sent to the server.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE EMBODIMENT

Figure 1:
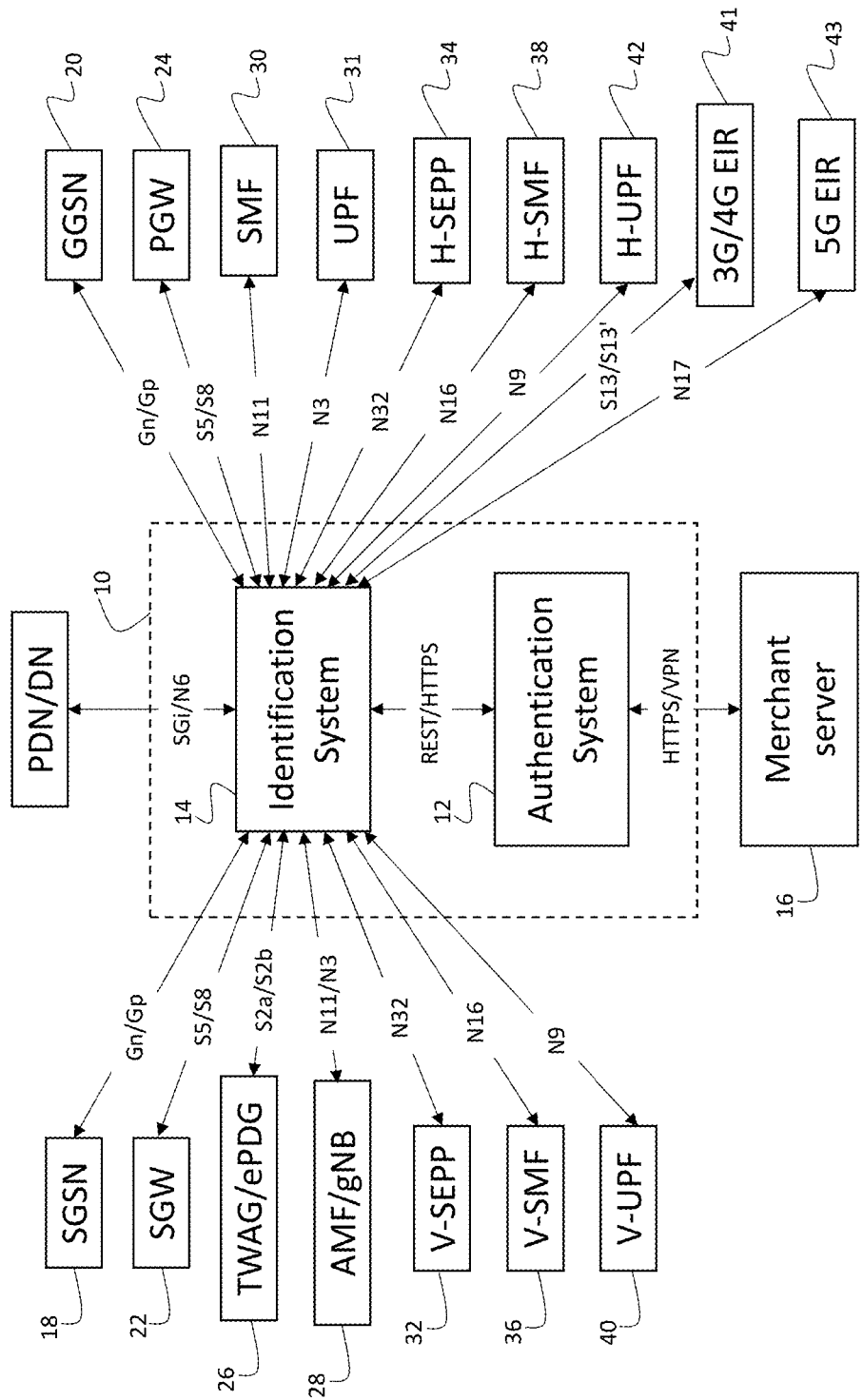
FIG. 1 is a block diagram is schematically depicting the Network interfaces of Identification System for intercepting 3G, 4G, 5G and Non-3GPP traffic access for S2a and S2b, to identify mobile subscriber in real time, and Authentication System to authenticate the same subscriber at 3rd party's online platform.

FIG. 1 depicts an embodiment of the invention having a subscriber verification system 10. FIG. 1 further depicts that subscriber verification system 10 comprises two sub-systems: Authentication System 12 and Identification System 14. Verification system 10 is configured to enable seamless identification and authentication of a subscriber requesting to connect to a Merchant server 16 via a telecommunications network. Merchant server 12 is communicatively coupled to Authentication System 12. Authentication System 12 is configured to handle application programing interface (API) requests from Merchant's online platform to authenticate the subscriber. Identification Systems 14 is configured to intercept the subscriber traffic exchanged between mobile network operator (MNO) core network nodes for building session database.

Authentication System 12 can be deployed on a cloud to handle authentication requests from Merchant's online platform server over Hyper Text Transfer Protocol Secured (HTTPS)/Virtual Private Network (VPN) to authenticate the mobile subscriber. In an embodiment, Authentication System 12 is configured to trigger API requests toward Identification System 14 in real time for validation of subscriber credentials provided to Authentication System 12 by Merchant server 16.

FIG. 1 further depicts that Identification System 14 can be configured to work with various telecommunications networks, including 3G, 4G, 5G and Non-3GPP networks. For example, FIG. 1 depicts that in a 3G network, Identification System 14 can be positioned on Gn/Gp interfaces between SGSN 18 and GGSN 20 to intercept 3G traffic exchanged between these network nodes. In a 4G network, Identification System 14 can be positioned on S5/S8 interfaces between SGW 22 and PGW 24 to intercept 4G traffic exchanged therebetween. For Non-3GPP access, Identification System 14 can be positioned on S2a/S2b interfaces between TWAG/ePDG 26 on one side and GGSN 20 or PGW 24 on the other side. Finally, in a 5G deployment, for Non-Roaming and Local Breakout scenarios, Identification System 14 can be positioned on N11/N3 interfaces between Access and Mobility Management function (AMF)/Next generation Node-B (gNB) 28, and Session Management Function (SMF) 30/User Plane Function (UPF) 31. For 5G Home Routed Roaming scenario, Identification System 14 can be deployed and on N32 interface between visited Security Edge Protection Proxy (V-SEPP) 32 and home SEPP (H-SEPP) 34, N16 interface between V-SMF 36 and H-SMF 38, and/or N8 interface between V-UPF 40 and H-UPF 42.

Furthermore, FIG. 1 depicts that Identification System 14 can be configured to communicate with a 3G/4G Equipment Identity Register (EIR) 41 over S13/S13' interface and/or communicate with a 5G EIR 43 over N17 interface.

Figure 2:
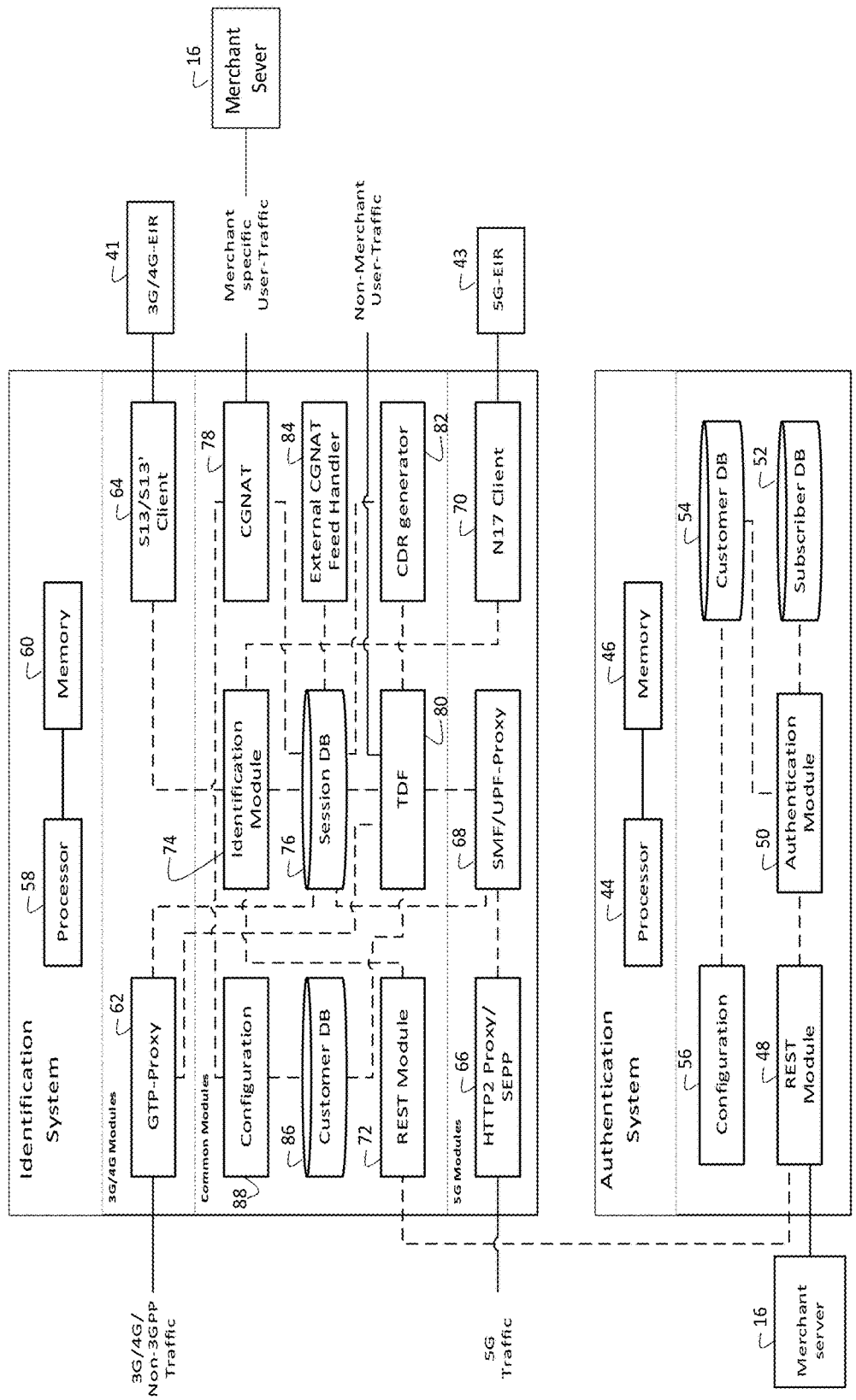
FIG. 2 is a block diagram schematically depicting all the modules of the system along with all the interfaces and required inter-connections.

FIG. 2 provides a block diagram depicting structures of Authentication System 12 and Identification System 14. FIG. 2 depicts that Authentication System 12 comprises a processor 44 and a non-transitory computer readable medium (Memory) 46. Authentication System 12 further includes a Representational State Transfer (REST) module 48. REST module 48 is communicatively coupled to Merchant server 16 and is configured to handle REST API requests received therefrom. REST module 48 is further configured to trigger API requests toward Identification System 14.

FIG. 2 further depicts that Authentication System 12 comprises an Authentication module 50. Authentication module 50 is configured to communicate with REST module 48. Authentication module 50 contains the logic for customer validation and subscriber authentication. To that end, Authentication module 50 is configured to access a Customer database 54 and a Subscriber database 52. Customer database 54 stores a list of legitimate customers (i.e., Merchants and Enterprises) and their respective service contracts. Subscriber database 52 stores mappings of User Equipment (UE) information attributes including MSISDN, IMSI, and IMEI for 3G/4G access, GPSI, SUPI, and PEI for 5G access, and/or UE Location. Authentication module 50 is configured to detect changes with respect to the attributes mapped in Subscriber database 52 and trigger corresponding alerts to Merchant server 16. Authentication System 12 also comprises a Configuration module 56 for provisioning network, system, MNO, scalability, customer service contracts configurations and alert notifications.

Next, FIG. 2 depicts that Identification System 14 has a computer processor 58 and a non-transitory computer-readable medium (Memory) 60 having a set of instructions stored thereon configured to be executed by processor 58. In an embodiment, Identification System 14 comprises a GTP-Proxy 62 for handling 3G/4G/Non-3GPP traffic. GTP-Proxy 62 is configured to intercept session establishment messages between network nodes—for example, between SGSN 18 and GGSN 20 over Gn/GP interface for 3G traffic, between SGW 22 and PGW 24 over S5/S8 interface for 4G (LTE) traffic, and between TWAG/ePDG 26 over S2a/S2b interface and GGSN 20, PGW 24, or SMF/UPF 31 for Non-3GPP access. Identification System 14 also includes of a S13/S13' client 64 configured to communicate with EIR 41 to perform UE validation for 3G, 4G, or Non-3GPP access.

In an embodiment used for 5G implementation, Identification System 14 includes HTTP/2 Proxy 66 configured to intercept messages between V-SEPP 32 and H-SEPP 34 and/or SMF/UPF Proxy 68 configured to intercept messages between V-SMF 36/V-UPF 40 and H-SMF 38/H-UPF 42. Identification System 14 can further comprise a N17 client 70 configured to communicate with 5G EIR 43 to perform UE validation.

Next, FIG. 2 depicts that Identification System 14 is communicatively coupled to Authentication System 12. Specifically, Identification System 14 comprises a REST module 72 configured to communicate with and handle REST APIs from REST module 48 of Authentication System 12. REST module 72 is communicatively coupled to Identification module 74. Identification module 74 is configured to process the API requests received from Authentication System 12. Identification module 74 is further configured to respond to authentication requests received from Authentication System 12 with a Success or a Failure response along with pertinent UE attributes, which may include an International Mobile Subscriber Identity (IMSI), a Mobile Station International Subscriber Director Number (MSISDN), an International Mobile Equipment Identity (IMEI), an Internet Protocol (IP) address, a Generic Public Subscription Identifier (GPSI), a Subscription Permanent Identifier (SUPI), and a Permanent Equipment Identifier (PEI) and User Location Information.

Identification System further includes Session database 76. When GTP-Proxy 62, HTTP/2 Proxy 66, or SMF/UPF Proxy intercepts messages between network nodes, UE attributes are extracted from these messages and stored within Session database 76. In this manner, Session database 76 is configured to store session-level information of all active sessions in the system. Subsequently, when requested by Authentication System 12 to identify and authenticate the UE requesting access to Merchant server 16, Identification module 74 accesses Session database 76 to retrieve UE attributes stored therein. If the UE attributes within Session dataset 76 match the UE attributes received in the authentication request from the Authentication System 12, then Identification System 14 responds with a Success message, as will be explained in more detail below. Otherwise, if the UE attributes do not match, Identification System 14 responds with a Failure message.

Identification System 14 may further include a CGNAT module 78. CGNAT module 78 is used for translating the private IP address of the UE to a public IP address used for exchanging traffic directly with Merchant server 16. In this manner, CGNAT module 78 enables Identification System 14 to map stored identification values extracted from the session creation messages with the public IP address and port information used for the data session.

Identification System 14 may also comprise a TDF module 80. TDF module 80 can be configured to receive and identify subscriber traffic from the UE. TDF module 80 can be configured to offload Merchant-specific subscriber traffic directly toward Merchant server 16 via local CGNAT module 78. For traffic not directed to Merchant server 16, TDF module 80 can be configured to forward the complete traffic toward the appropriate network node of the MNO, for example GGSN 20, PGW 24, UPF 31, or H-UPF 42. Identification System 14 can further comprise a CDR Generator 82, for generating Call Data Records (CDRs) of subscriber's traffic offloaded via CGNAT module 78 towards Merchant server 16.

In an embodiment, Identification Module 14 may further comprise an external CGNAT feed handler 84. Some MNOs do not allow local CGNAT offload, and therefore, external CGANT feed handler 84 can be used to receive and process an external feed from an MNO's CGNAT. In this manner, external CGANT feed handler 84 is able to retrieve the public IP address and the IP port information used by MNO's CGNAT for the established data session. The retrieved public IP address and the IP port information can be stored in Session database 76 along with the UE identification information—such as MSISDN, IMSI, IMEI, GPSI, SUPI, PEI, User Location, etc.—to enable subsequent UE identification and verification based on the public IP address of the UE and/or IP port information provided by Merchant server 16.

Identification Module 14 also includes a Customer database 86. Customer database 86 is used to store a list of legitimate Merchants who enroll to use the subscriber verification system 10.

Identification System 14 may also include a Configuration module 88. Configuration module 88 is communicatively coupled to Customer database 86 and can be used for provisioning network, system modules, and scalability information.

Figure 3:
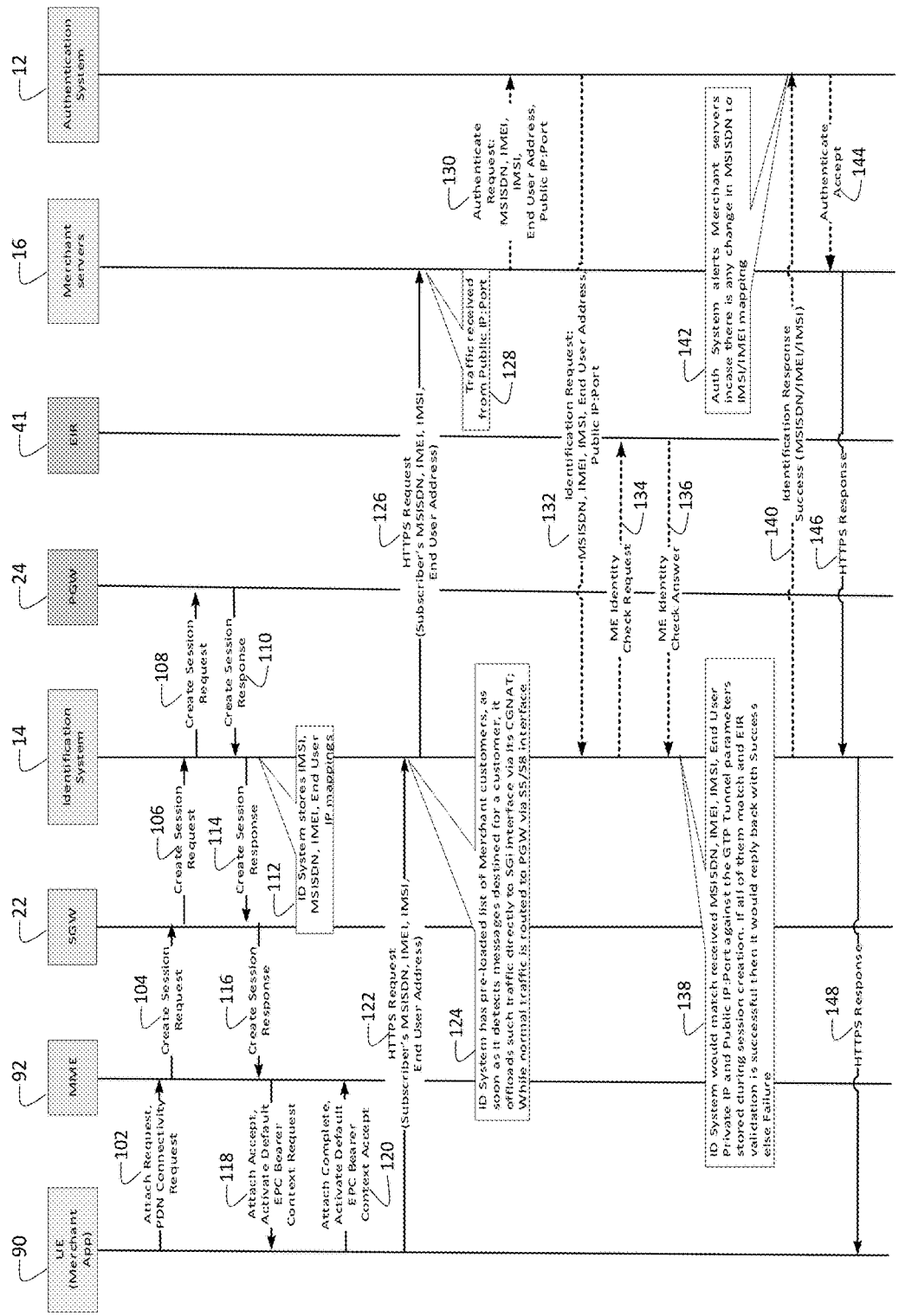
FIG. 3 is a sequential diagram schematically depicting the procedure for Subscriber Identification and Authentication during LTE session when Merchant's Mobile Application is used.

FIGS. 3-9 provide signaling diagrams illustrating various implementations of subscriber verification system 10. FIG. 3 pertains to a scenario in which UE 90 uses a merchant application installed on UE 90 to request access to Merchant server 16 via an LTE network. UE 90 initiates the process in step 102 by sending an attach request toward MME 92. In step 104, MME 92 sends a Create Session Request message to SGW 22. In step 106, Identification System 14 receives the Create Session Request message from SGW 22, wherein the Create Session Request message is intercepted by GTP-Proxy 62 of Identification System 14. Identification System 14 decodes the intercepted Create Session Request message and extracts information elements (IEs) therefrom that identify UE 90, including MSISDN, IMSI, IMEI, and/or User Location Information (ULI) (also referred to herein as "identification values"). Identification System 14 stores the extracted IEs in Session database 76.

In step 108, Identification System 14 forwards the Create Session Request to PGW 24. In step 110, PGW 24 responds with a Create Session Response message, which is received by GTP-Proxy 62 of Identification System 14. In step 112, Identification System 14 retrieves the End User IP Address allocated to the UE for the session by PGW 24, maps the End User IP Address of the UE to the IEs stored in Session database 76, and stores the IP Address of the UE in Session database 76.

In step 114, Identification System 14 forwards the Create Session Response toward SGW 22 for GTP Tunnel establishment. In step 116, SGW 22 forwards the Create Session Response to MME 92. In step 118, MME 92 sends an Attach Accept message to UE 90 and, in step 120, UE 90 responds with an Attach Complete message. At this point the data session for UE 90 is established.

In step 122, subsequent to establishing the data session, when a subscriber tries to connect to Merchant server 16 using the Merchant application installed on UE 90, UE 90 sends an HTTPS request toward Merchant server 16. The HTTPS request contains a set of identification information associated with UE 90, including MSISDN, IMSI, IMEI, ULI, and/or End User IP Address, which can be read from UE 90 by the Merchant application installed thereon.

The HTTPS request is carried inside a GTP User-plane (GTP-U) tunnel over S5/S8 interface and is intercepted by GTP-Proxy 62 of Identification System 14. In step 124, GTP-Proxy 62 forwards the HTTPS request to TDF module 80 of Identification System 14. TDF module 80 queries Customer database 86 of Identification System 14 to determine whether Merchant server 16 to which the HTTPS request is directed belongs to a legitimate Merchant enrolled into the subscriber verification system 10. If TDF module 80 determines the HTTPS request is destined to Merchant server 16 belonging to an enrolled Merchant, TDF module 80 offloads the HTTPS request over SGi interface towards Merchant server 16 by using CGNAT module 78, which sends the HTTPS request to Merchant server 16 in step 126. Otherwise, if the HTTPS request is not directed to Merchant server 16, TDF module 80 of Identification System 14 forwards the HTTPS request to MNO's PGW 24 inside GTP-U tunnel.

Upon receiving the HTTPS request, Merchant server 16 needs to authenticate whether the received MSISDN, IMSI, IMEI, ULI, and End User IP Address attributes in the HTTPS request actually belong to UE 90 requesting Merchant's online services. In step 128, Merchant server 16 identifies the source Public IP Address and source Port number from which the HTTPS request was received. Next, in step 130, Merchant server 16 triggers an API authentication request toward Authentication System 12. The authentication request contains the set of the identification values associated with UE 90 received in the HTTPS request—i.e., MSISDN, IMSI, IMEI, ULI, and End User IP Address—and also includes the source Public IP Address and Port number from which the HTTPS request was received.

Upon receiving the authentication request from Merchant server 16, Authentication System 12 performs a lookup for applicable Identification System 14 based on the source Public IP Address and Port information received in the authentication request. In step 132, Authentication System 12 sends an identification request toward Identification System 14 via an internal API. The identification request includes all information that Authentication system 12 received from Merchant server 16 in the authentication request.

At Identification System 14, the received identification request is handled by Identification module 74. In steps 134, S13/S13' Client 64 of Identification System 14 is used to perform Mobile Equipment (ME) validation by triggering ME identity check request towards EIR 41. EIR 41 verifies that UE 90 is not blacklisted and responds to Identification System 14 in step 136.

Next, in step 138, Identification module 74 uses the Public IP Address and Port information provided by Merchant server 16 to retrieve a set of identification values i.e., MSISDN, IMSI, IMEI, ULI, End User IP Address-stored in Session database 76. As explained above, Identification System 14 previously extracted these stored identification values from intercepted messages during session establishment procedure. Next, Identification module 74 compares the identification values associated with UE 90 stored in Session database 76 against the identification values Merchant server 16 received with the HTTPS request and provided in the identification request. If the set of values received in the identification request matches the corresponding values stored in Session database 76, Identification system 14 sends a Success identification response to Authentication System 12 in step 140. The identification response further contains the set of identification values retrieved from Session database 76.

Upon receiving the identification response, in step 142, Authentication System 12 validates the identification values provided by Identification System 14 against the identification values previously stored in Subscriber database 52 of Authentication System 12. If there is a change in the identification values from the previous session of the same subscriber, the Authentication System 12 will trigger a corresponding alert toward Merchant server 16. However, if the subscriber is successfully validated, then, in step 144, Authentication system sends a successful authentication response toward Merchant server 16. In step 146, Merchant server 16 sends a successful HTTPS response to Identification System 16, which is then forwarded to UE 90 in step 148. At this point, UE 90 is successfully authenticated and is granted access to Merchant server 16.

Figure 4:
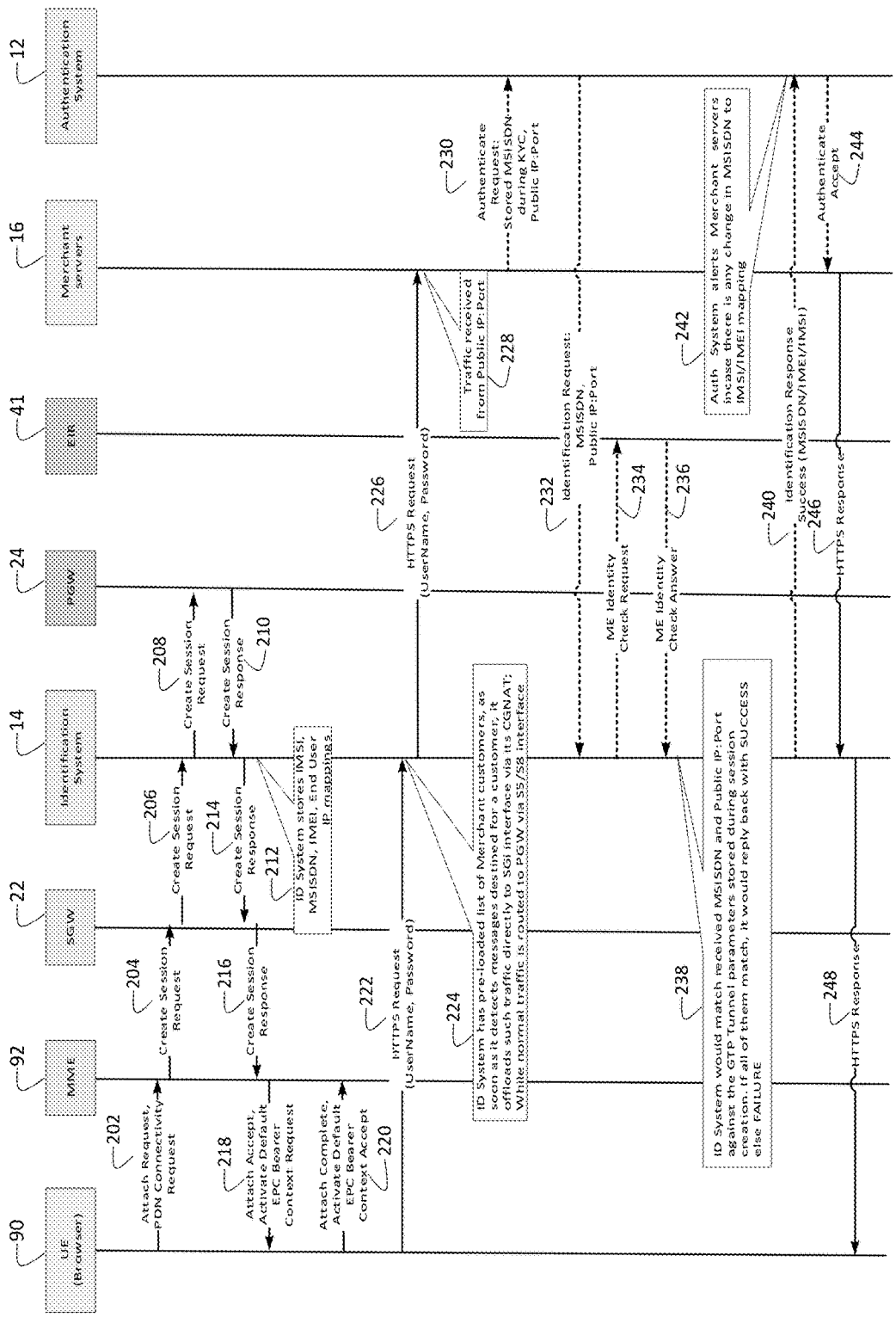
FIG. 4 is a sequential diagram schematically depicting the procedure for Subscriber Identification and Authentication during LTE session when Web-browser is used.

In the embodiment depicted in FIG. 4, a subscriber uses a web browser installed on UE 90, rather than a Merchant application, to access Merchant server 16. In this embodiment steps 202-220 are substantially the same as the steps 102-120 discussed above with reference to FIG. 3. However, in step 222, when UE 90 sends an HTTPS request via a web browser installed thereon to access Merchant server 16, the HTTPS request contains subscriber credentials—for example, username and password—rather than a set of identification information associated with UE 90 (as was the case in step 122 of FIG. 3).

Identification System 14 receives the HTTPS request and, in step 224, determines that the HTTPS request is directed to Merchant server 16 and uses CGNAT module 78 to forward the HTTPS request to Merchant server 16, in step 226. In step 228, Merchant server 16 identifies the Public IP Address and Port number from which the HTTPS request was received. In this manner, steps 224-228 are substantially the same as steps 124-128 of FIG. 3.

Next, Merchant server 16 retrieves the MSISDN (and any other available identification values) associated with UE 90, which Merchant server 16 stored during subscriber onboarding or Know Your Customer (KYC) procedure. This retrieved MSISDN is the identification value associated with UE 90 that the Merchant Server needs to authenticate in order to provide online services to UE 90. In step 230, Merchant server 16 sends an authenticate request to Authentication System 12. The authentication request contains the retrieved MSISDN and source Public IP address and Port information from which Merchant server 16 received the HTTPS request. The authentication request may also include the follow identification values associated with UE 90, if such information is available: ULI, IMSI, IMEI, End User IP Address.

In step 232, Authentication System 12 sends an identification request containing the MSISDN and the source Public IP Address and Port information provided by Merchant server 16. Next, steps 234-236 are analogous to steps 134-136 explained with reference to FIG. 3. In these steps, Identification System 14 verifies with EIR 41 that UE 90 is not blacklisted.

In step 238, Identification System 14 retrieves the MSISDN from Session database 76 based on the source Public IP address and port information. Next, Identification System 14 compares the MSISDN provided by Merchant server 16 against the MSISDN stored in Session database 76. If the values match, Identification System 14 responds to Authentication System 12 with a Success response in step 240. The response also includes the identification values (MSISDN, IMEI, and IMSI) retrieved from Sessions database 76. The remaining steps 242-248 are substantially the same as steps 142-148 discussed above with respect to FIG. 3.

Figure 5:
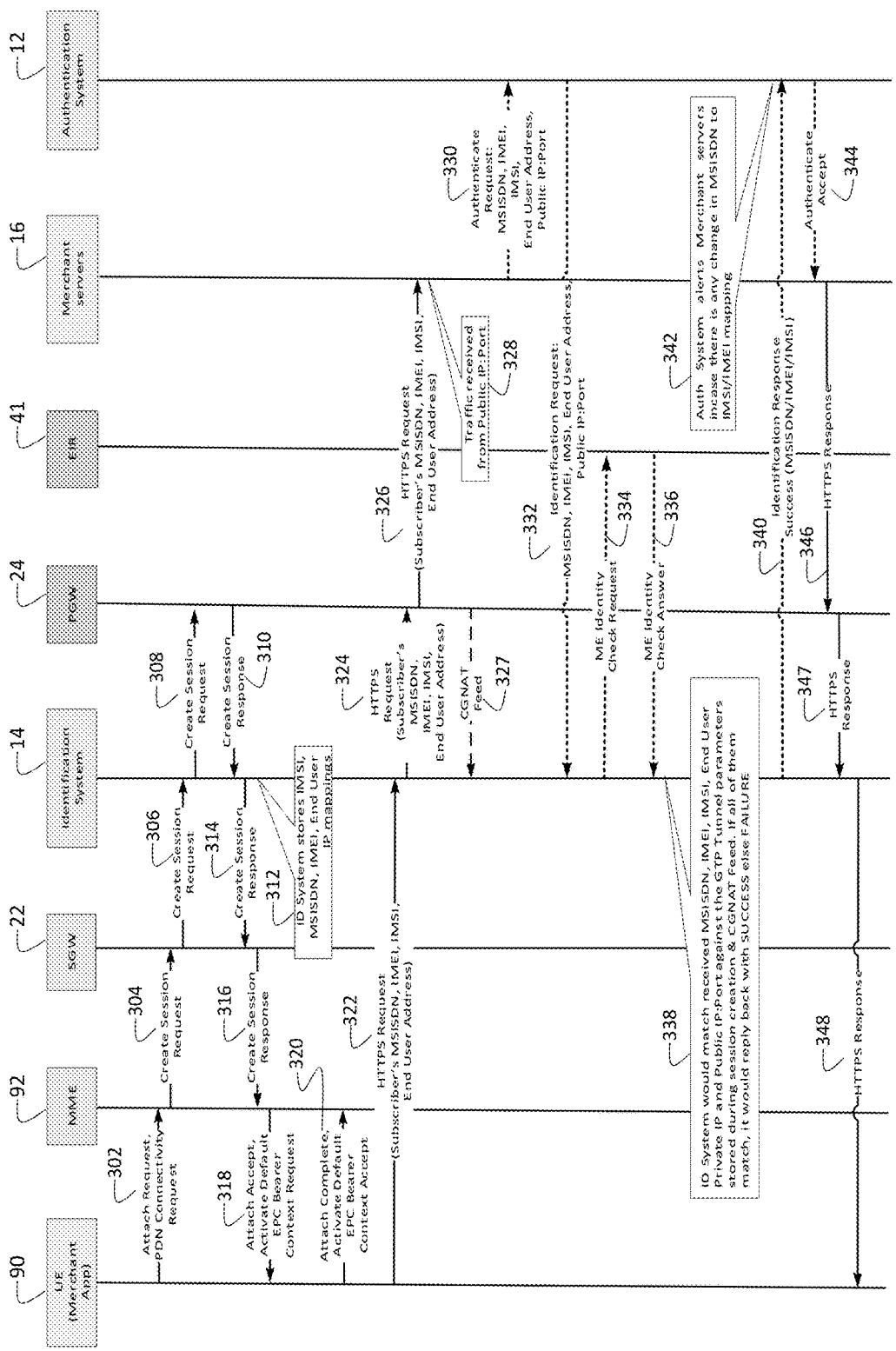
FIG. 5 is a sequential diagram schematically depicting the procedure for Subscriber Identification and Authentication during LTE session when Merchant's Mobile Application is used with external CGNAT feed from MNO.

FIG. 5 depicts the signaling flow for an embodiment in which the MNO does not allow local CGNAT offload. In this embodiment the subscriber is requesting to access Merchant server 16 using the Merchant application installed on UE 90. In this embodiment, steps 302-322 are substantially the same as steps 102-122 discussed about with reference to FIG. 3.

In the embodiment of FIG. 5, internal CGNAT module 78 of Identification System 14 is not used due to the MNO's deployment policy prohibiting local CGNAT offload. Therefore, in step 324, after receiving the HTTPS request from UE 90, Identification System 14 forwards the HTTPS request to PGW 24 of the MNO over a GTP-U Tunnel. In step 324, PGW 24 forwards the HTTPS request, which includes a set of identification values associated with UE 90, to Merchant server 16.

In step 327, Identification System 14 utilizes external CGNAT feed handler 82 to receive and process the CGNAT feed from PGW 24. From the received CGNAT feed, Identification System 14 determines the Public IP address and port number from which the HTTPS request was sent. Then, based on the source Public IP address and port information provided in MNO's CGNAT feed, Identification System 14 retrieves private End User IP Address associated with UE 90. Based on the End User IP Address, Identification System 14 is able to retrieve MSISDN, IMSI, IMEI, and/or ULI associated with UE 90 from Session database 76 and map these identification values to the Public IP address and Public Port information for subsequent verification. The remaining steps 330-348 are substantially similar to steps 130-148 discussed above with reference to FIG. 3.

Figure 6:
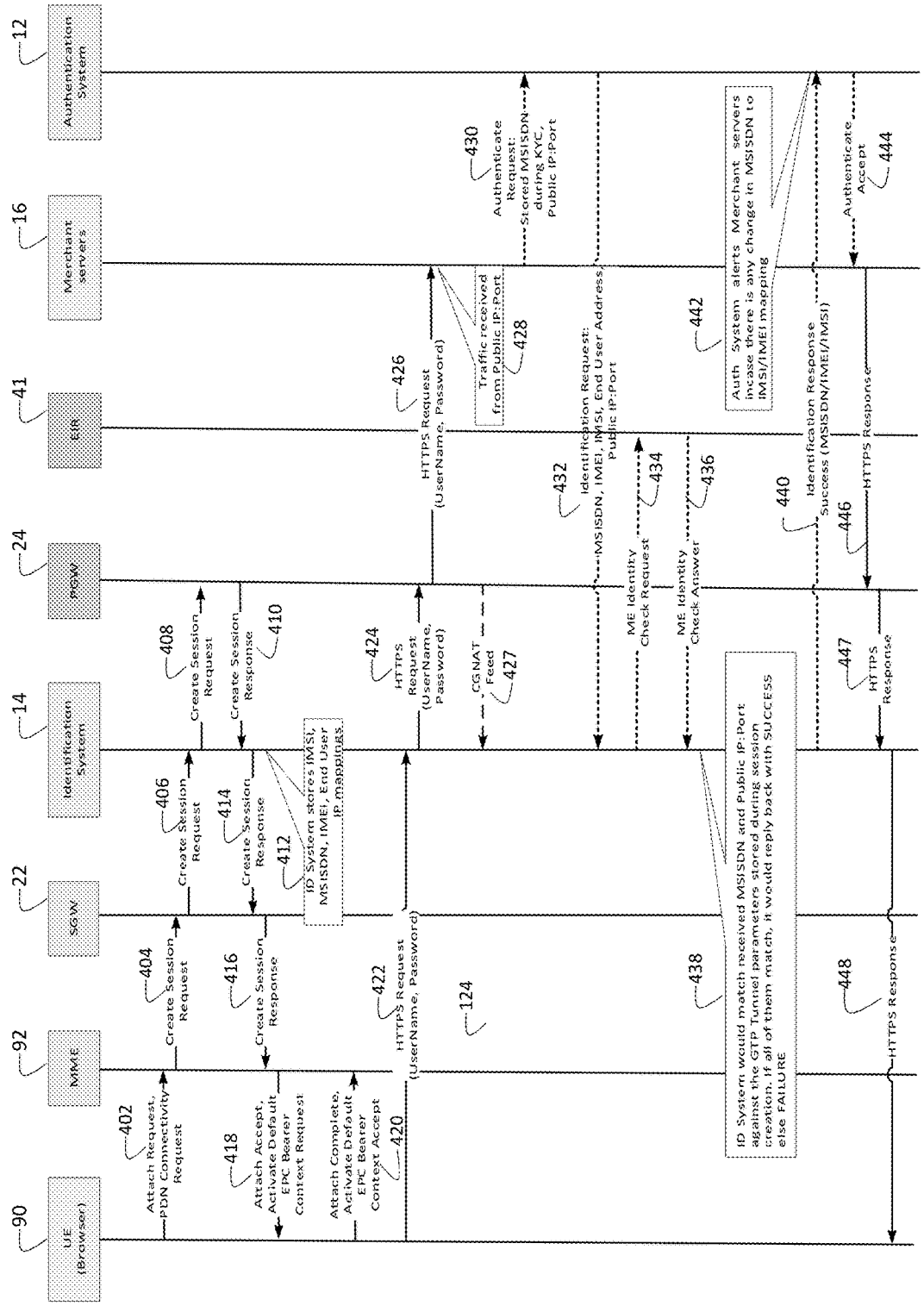
FIG. 6 is a sequential diagram schematically depicting the procedure for Subscriber Identification and Authentication during LTE session when Web-browser is used with external CGNAT feed from MNO.

FIG. 6 depicts an embodiment in which the MNO does not permit local CGNAT offload, and, in which, the subscriber requests to use Merchant's services via a web browser installed on UE 90. Steps 402-428 of this embodiment are substantially similar to steps 302-328 of the embodiment depicted in FIG. 5 and discussed in more detail above. However, in the embodiment of FIG. 6, because the HTTPS request to access Merchant server 16 is sent using a web browser rather than a Merchant application installed on UE 90, the HTTPS request carries subscriber's credentials—e.g., username and password-rather than a set of identification values associated with UE 90. For this reason, Merchant server 16 uses the subscriber's credentials to retrieve the MSISDN (and any other available identification values associated with UE 90) that Merchant server 16 previously stored during subscriber onboarding or KYC procedure. The remaining steps 432-448, during which the MSISDN is verified and UE 90 is authenticated are analogous to the steps 232-248 described above with reference to FIG. 4.

Figure 7:
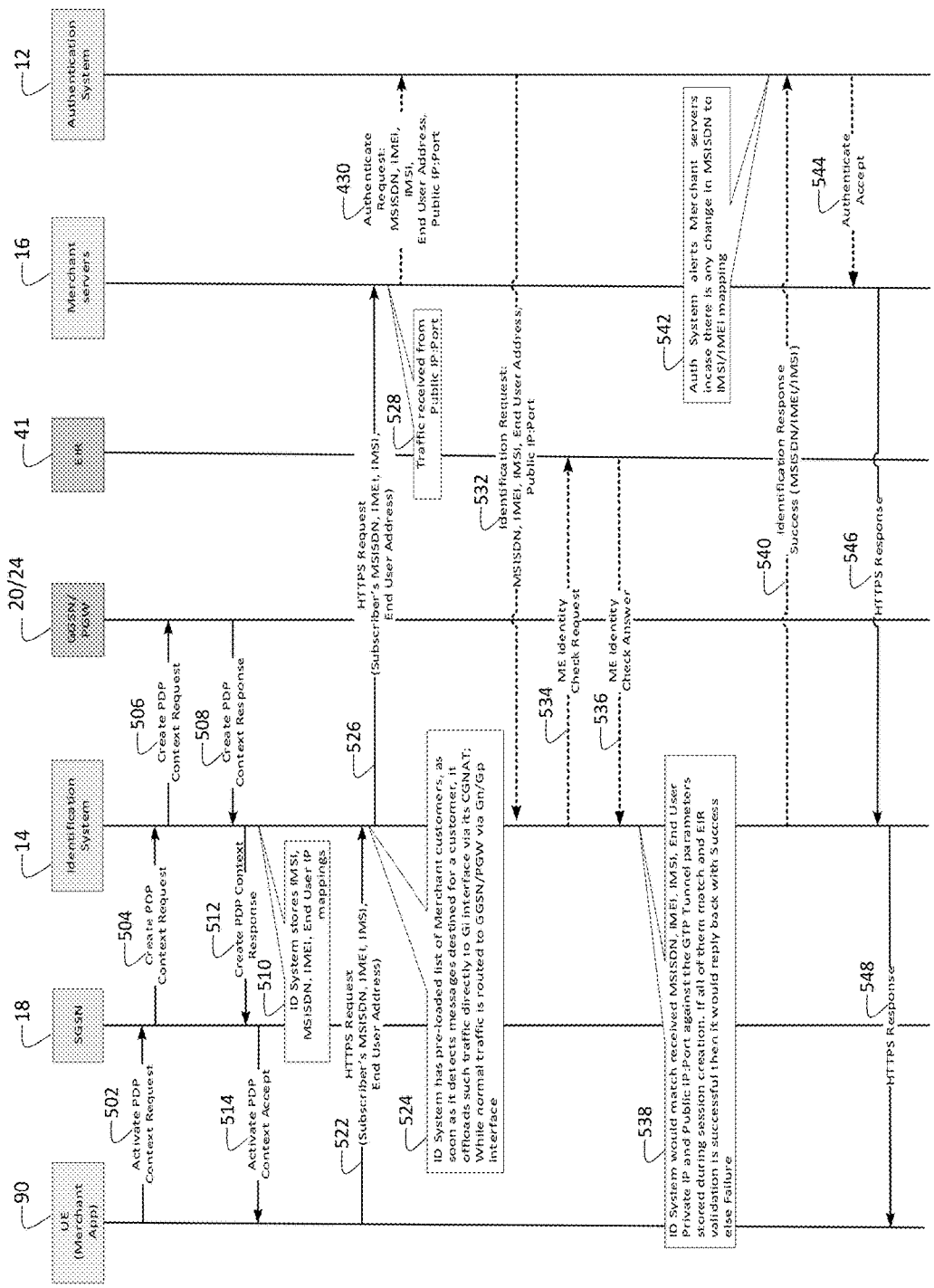
FIG. 7 is a sequential diagram schematically depicting the procedure for Subscriber Identification and Authentication during 3G PDP session.

FIG. 7 depicts an embodiment in which subscriber verification system 10 is deployed in a 3G network. The method begins with the step 502, in which UE 90 sends a Create PDP Context Request to SGSN 18. In step 504, Identification System 14 receives the Create PDP Context Request, which is intercepted by GTP-Proxy 62. GTP-Proxy 62 decodes the Create PDP Context Request message and extracts a set of identification values associated with UE 90, including MSISDN, IMSI, IMEI and ULI. Identification System 14 stores these values in Session database 76.

In step 506, Identification System 14 forwards the Create PDP Context Request toward PGW 24. In step 508, PGW 24 responds with a Create PDP Context Response. In step 510, Identification System 14 retrieves the End User IP Address allocated to session by PGW 24, maps the End User IP Address to the stored set of identification values within Session database 76, and stores the End User IP Address in Session database 76. In step 512, Identification System 14 forwards the Create PDP Context Response toward SGSN 18 for GTP Tunnel establishment. In step 514, SGSN 18 sends Active PDP Context Accept message to UE 90. The remaining steps 522-548 are substantially the same as the steps 122-148 discussed above with reference to FIG. 3.

Figure 8:
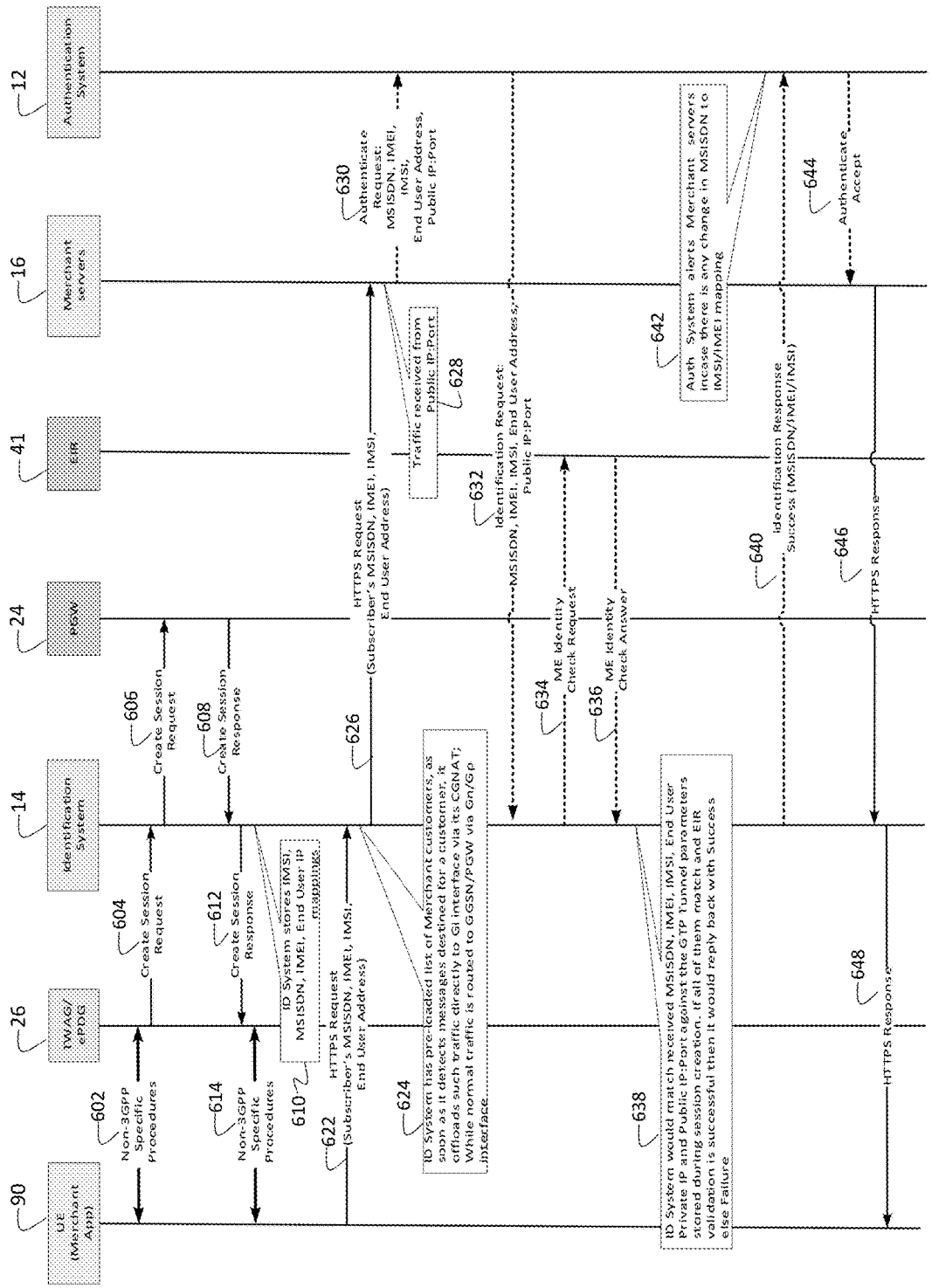
FIG. 8 is a sequential diagram schematically depicting the procedure for Subscriber Identification and Authentication during Non-3GPP Access over S2a/S2b interfaces.

FIG. 8 depicts an embodiment pertaining to Non-3GPP Access. The process begins with step 602, in which UE 90 and TWAG/ePDG 26 perform procedures specific to Non-3GPP access. Next, in step 604, TWAG/ePDG 26 sends a Create Session Request message, which is intercepted by intercepted by GTP-Proxy 62 of Identification System 14. GTP-Proxy 62 decodes the Create Session Request message and extract a set of identification values associated with UE 90, including MSISDN, IMSI, IMEI and/or ULI and stores them in Session database 76. In step 606, Identification System 14 forwards the Create Session Request toward PGW 24. In step 608, PGW 24 responds with a Create Session Response message. In step 610, Identification System 14 retrieves the End User IP Address allocated to UE 90 by PGW 24, associates the End User IP Address with the extracted set of identification values stored in Session database 76, and also stores the End User IP Address Session database 76. In step 612, Identification System 14 forwards the Create Session Response toward TWAG/ePDG 26. In step 614, TWAG/ePDG 26 and UE 90 perform procedures specific to Non-3GPP access for GTP Tunnel establishment. Next, steps 622-648 are substantially similar to steps 122-148 discussed above with reference to FIG. 3.

Figure 9:
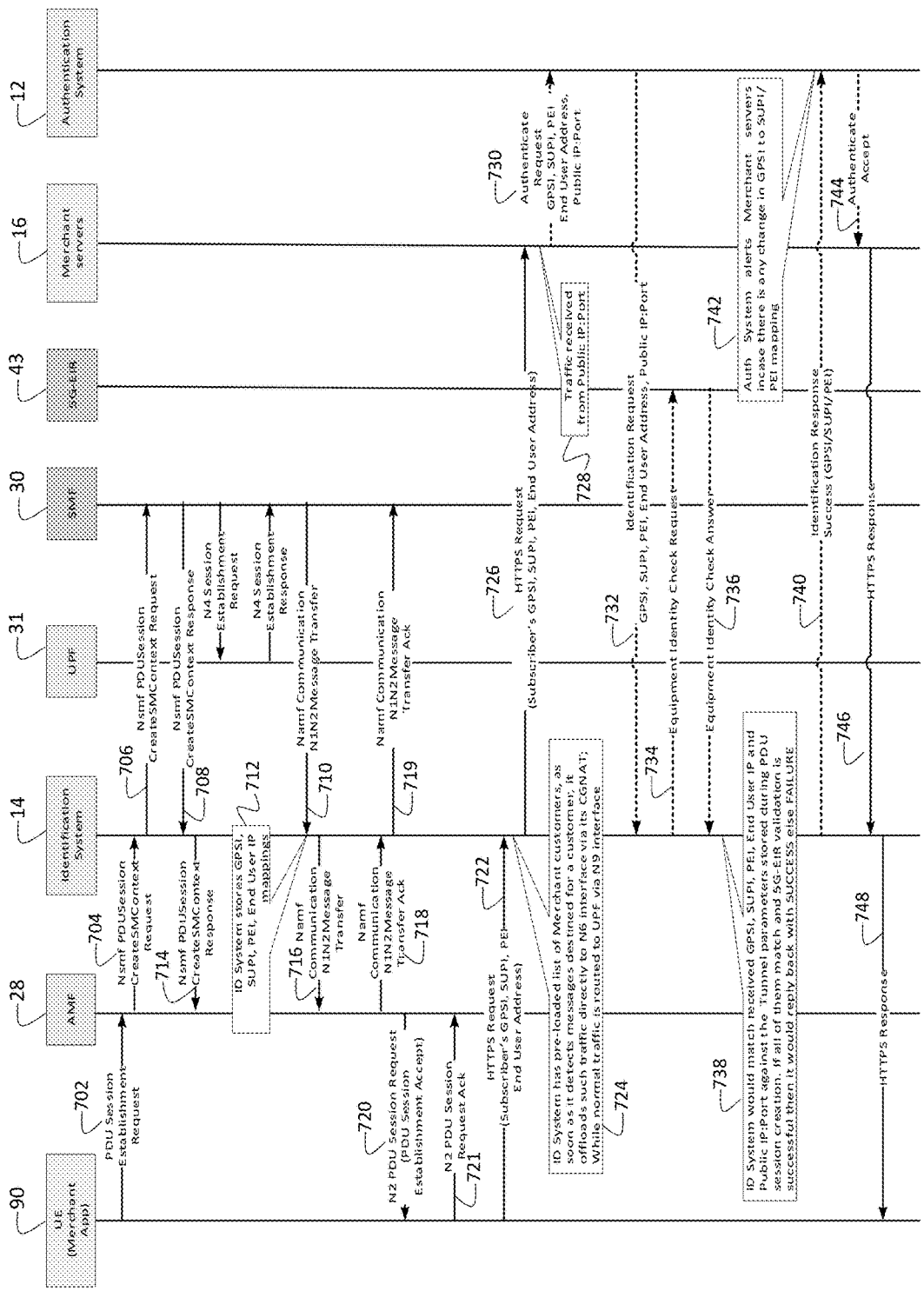
FIG. 9 is a sequential diagram schematically depicting the procedure for Subscriber Identification and Authentication during 5G PDU session.

FIG. 9 depicts an embodiment in which subscriber verification system 10 is deployed in a 5G Non-Roaming or Local Breakout (LBO) roaming. In step 702, UE 90 sends PDU Session establishment request to AMF 28. In step 704, AMF 28 sends a Nsmf-PDUSession-CreateSMContext Request, which is intercepted by SMF-Proxy 68 of Identification System 14. Identification System 14 decodes the intercepted message and extracts a set of identification values associated with UE 90, including GPSI, SUPI, PEI and ULI and stores these values in Session database 76. In step 706, Identification System 14 forwards the Nsmf-PDUSession-CreateSMContext Request towards SMF 30. In step 708 and 710, SMF 30 responds with a Nsmf-PDUSession-CreateSMContext Response and a Namf-Communication-N1N2Message-Transfer messages. Upon receipt of these messages, Identification System 14 retrieves the End User IP Address allocated to UE 90 by SMF 30/UPF 31. In step 712, Identification System 14 associates the End User IP Address with the set of identification values stored in Session database 76 and stores the End User IP Address in Session database 76.

In steps 714 and 716, Identification System 14 forwards Nsmf-PDUSession-CreateSMContext Response and Namf-Communication-N1N2Message-Transfer messages to AMF 28. In step 718, AMF 28 responds with an acknowledgement message, and, in step 719, Identification System 14 forwards the acknowledgement message to SMF 30. In step 720, AMF 28 sends a N2 PDU Session Request message to UE 90, to which UE 90 responds with an acknowledgement message in step 721. At this point, the data session for UE 90 is established. Subsequent steps 722-748 are substantially the same as steps 122-148 described above with reference to FIG. 3.

For handling 5G Home-Routed roaming traffic (not depicted in the figures), Identification System 14 utilizes its SEPP module to intercept the signaling traffic over N32 interface using (1) HTTP/2-Proxy 66 positioned between V-SEPP and H-SEPP, (2) SMF-Proxy 68 positioned between V-SMF and H-SMF, and (3) UPF-Proxy positioned between V-UPF and H-UPF nodes to intercept the user plane traffic over N9 interface. The steps of verifying the set of identification values associated with UE 90 are substantially the same as those discussed with respect to other embodiments disclosed herein.

Figure 10:
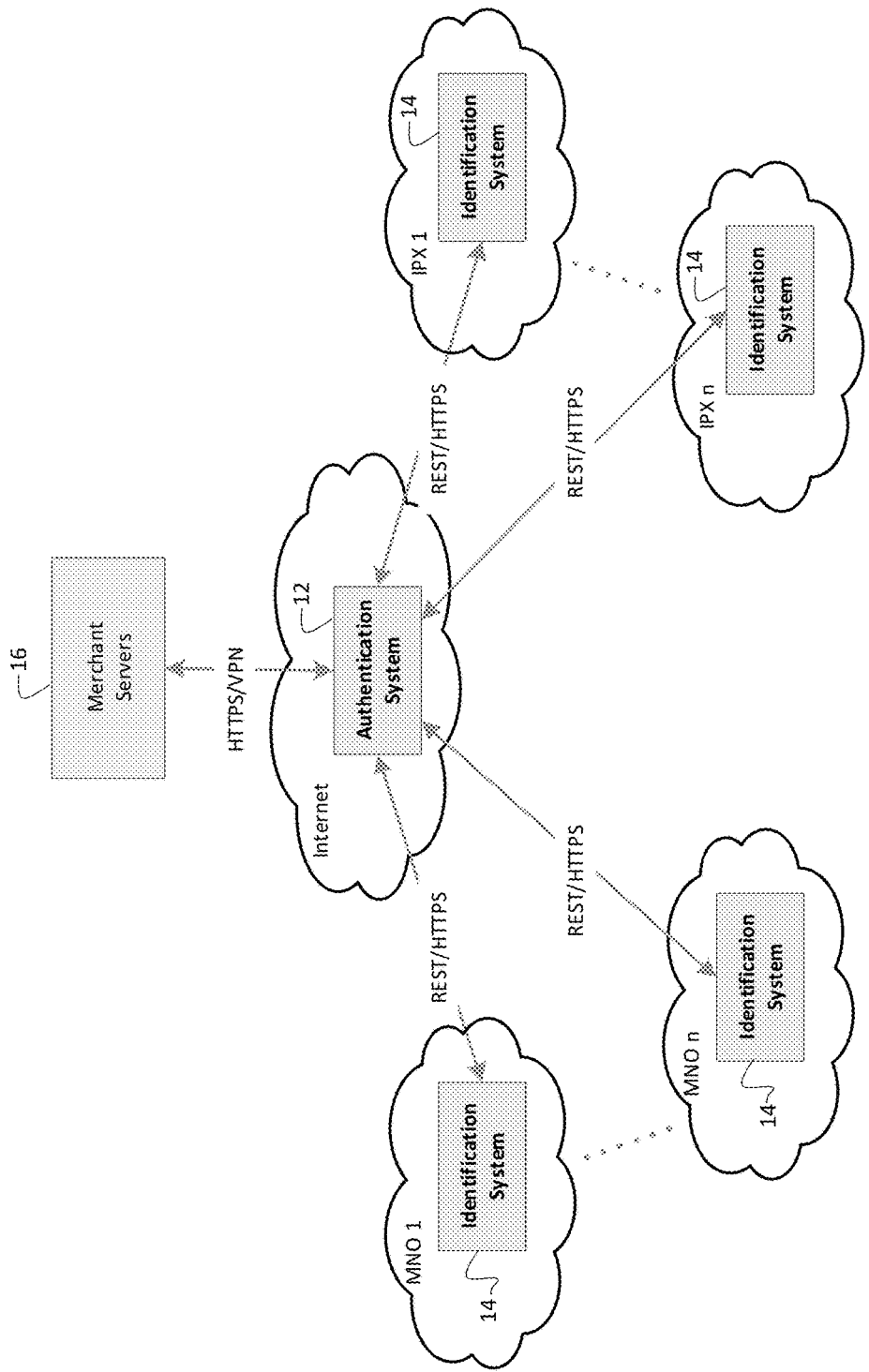
FIG. 10 is a block diagram schematically depicting sample deployment of subscriber verification system.

FIG. 10 depicts a block diagram illustrating a sample deployment of subscriber validation system 10. In this embodiment, Authentication System 12 is deployed on an internet cloud and is configured to communicate with one or more Merchant servers 16 via HTTPS/VPN connection. Authentication System 12 is further configured to communicate with Identification System 14. Identification System 14 can be deployed at one or more Internetwork Packet Exchange (IPX) clouds to handle roaming traffic. Alternatively, or in addition to, Identification System 14 can be deployed or at one or more MNO infrastructures to handle domestic traffic. A person of ordinary skill in the art will recognize that subscriber validation system 10 is not limited to this deployment architecture and can be extended or modified to meet networking, routing and business needs.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Hardware equipment may be agnostic as to general computing or may be telecommunications-specific. Some equipment providers include those under the brands HUAWEI, CISCO SYSTEMS, NOKIA, and QUALCOMM.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages like ERLANG (or Open Telecom Platform, OTP) may be used or scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of authenticating a User Equipment (UE) requesting to access a server via a telecommunications network, comprising:
    intercepting a first message sent from a first network node to a second network node, wherein the first message enables establishment of a data session for the UE;
    extracting from the first message a first set of identification values associated with the UE and storing the first set of identification values in a first database, wherein the first set of identification values associated with the UE is selected from a group consisting of an International Mobile Subscriber Identity (IMSI), a Mobile Station International Subscriber Director Number (MSISDN), an International Mobile Equipment Identity (IMEI), an Internet Protocol (IP) address, a Generic Public Subscription Identifier (GPSI), a Subscription Permanent Identifier (SUPI), and a Permanent Equipment Identifier (PEI);
    forwarding the first message to the second network node;
    subsequent to the data session being established for the UE, receiving an encrypted request from the UE to access a server;
    forwarding the encrypted request to the server, wherein responsive to receiving the encrypted request, the server obtains a second set of identification values;
    receiving a validation request from the server requesting to validate the UE, wherein the validation request includes the second set of identification values associated with the UE;
    comparing the second set of identification values received in the validation request from the server against the first set of identification values stored in the first database; and
    responsive to the second set of identification values matching the first set of identification values, sending an authentication confirmation to the server.

2. The method of claim 1, wherein the first network node is selected from a group consisting of a Serving Gateway (SGW), a Serving General Packet Radio Service Support Node (SGSN), a Trusted Wireless Local Area Network Access Gateway (TWAG), an evolved Packet Data Gateway (ePDG), and an Access and Mobility Management Function (AMF) and wherein the second network node is selected from a group consisting of a Packet Data Network Gateway (PGW), a Gateway General Packet Radio Service Support Node (GGSN), and a Session Management Function (SMF).

3. The method of claim 1, wherein the telecommunications network is selected from a group consisting of a 3G network, a 4G network, a 5G network, and a Non-3GPP network.

4. The method of claim 1, wherein the UE sends the encrypted request using an application installed on the UE.

5. The method of claim 4, wherein the encrypted request includes the second set of identification values, wherein the second set of identification values is selected from a group consisting of a MSISDN, an IMEI, an IMSI, an IP address, a Port number, a GPSI, a SUPI, and a PEI.

6. The method of claim 1, wherein the second set of identification values is stored during an onboarding procedure or a Know Your Customer (KYC) procedure and is configured to be accessed by the server based on user credentials provided in the encrypted request.

7. The method of claim 1, wherein the validation request includes a public IP address and a port number from which the encrypted request was received.

8. The method of claim 7, wherein the first set of identification values stored in the first database is associated with the public IP address and the port number.

9. The method of claim 8, wherein the public IP address and the port number are assigned by a Carrier-Grade Network Address Translation (CGNAT) module or retrieved by a CGNAT feed handler from the telecommunications network.

10. The method of claim 1, wherein the encrypted request bypasses the second network node.

11. The method of claim 1, further comprising the step of sending a request to an Equipment Identity Register (EIR) to validate a IMEI or a PEI associated with the UE to confirm that the UE has not been blacklisted.

12. The method of claim 1, wherein the validation request is received from the server via an application programming interface (API).

13. The method of claim 1, wherein a GPRS Tunneling Protocol (GTP) Proxy, a Hypertext Transport Protocol/2 (HTTP/2) Proxy, a Security Edge Protection Proxy (SEPP) Proxy, or a Session Management Function (SMF) Proxy is used to intercept the first message.

14. The method of claim 1, wherein the first set of identification values associated with the UE is stored in a second database, and wherein an alert is configured to be sent to the server responsive to detecting a change in one or more identification values relative to a previous session of the UE.

15. The method of claim 1, wherein the encrypted request from the UE to access the server is sent using a Hypertext Transfer Protocol Secure (HTTPS).

16. A system for authenticating a User Equipment (UE) requesting to access a server via a telecommunications network, the system having a computer processor communicatively coupled to a non-transitory computer readable medium having a set of instructions stored thereon, the system comprising:
    an Identification System communicatively coupled to a first network node and a second network node of a mobile telecommunications network, the Identification System comprising:

a proxy configured to intercept a first message sent from the first network node to the second network node and extract a first set of identification values associated with the UE from the first message;

a first database used to store the first set of identification values associated with the UE;

a Carrier-Grade Network Address Translation (CG-NAT) or a CGNAT feed handler configured to enable the Identification System to associate a public IP address and a port number used to send an encrypted request for the UE to access the server with the first set of identification values stored in the first database;

a first Representational State Transfer (REST) module configured to receive a validation request from the server sent via an Application Programming Interface (API), wherein the server is configured to send the validation request responsive to receiving the encrypted request for the UE to access the server, the validation request having a second set of identification values associated with the UE and the public IP address and the port number from which the server received the encrypted request; and wherein the first set of the identification values associated with the UE is retrieved from the first database based on the public IP address and the port number received in the validation request, and wherein the second set of identification values received in the validation request is compared against the first set of identification values retrieved from the first database, wherein responsive to the second set of identification values matching the first set of identification values, an authentication confirmation is sent to the server via the API.

17. The system of claim 16, further comprising an Authentication System communicatively coupled to the Identification System and the server, wherein the Authentication System comprises a second REST module configured to receive the validation request from the server and configured to send the validation request to the Identification System and to receive the authentication confirmation from the Identification System and to notify the server whether the UE is authorized to access the server.

18. The system of claim 17, wherein the Authentication System comprises a second database configured to store the first set of identification values associated with the UE, and wherein alert is sent to the server responsive to detecting a change in one or more identification values relative a previous session associated with the UE.

19. The system of claim 16, wherein the proxy is selected from a group consisting of a GPRS Tunneling Protocol (GTP) Proxy, a Hypertext Transport Protocol/2 (HTTP/2) Proxy, a Security Edge Protection Proxy (SEPP) Proxy, and a Session Management Function (SMF) Proxy.

20. The system of claim 16, wherein the first set of identification values associated with the UE is selected from a group consisting of an International Mobile Subscriber Identity (IMSI), a Mobile Station International Subscriber Director Number (MSISDN), an International Mobile Equipment Identity (IMEI), an Internet Protocol (IP) address, a Generic Public Subscription Identifier (GPSI), a Subscription Permanent Identifier (SUPI), and a Permanent Equipment Identifier (PEI).

21. The system of claim 16, wherein the Identification System further comprises a N17 client for triggering validation of a PEI associated with the UE toward a 5G Equipment Identity Register (EIR) or a S13 client or a S13' client for triggering validation of IMEI associated with the UE toward a 3G EIR or a 4G EIR.

22. The system of claim 16, wherein the encrypted request includes the second set of identification values, wherein the second set of identification values is selected from a group consisting of a MSISDN, an IMEI, an IMSI, an IP address, a Port number, a GPSI, a SUPI, and a PEI.

23. The system of claim 16, wherein the second set of identification values is stored during an onboarding procedure or a Know Your Customer (KYC) procedure and is configured to be accessed by the server based on user credentials provided in the encrypted request.

24. The system of claim 16, wherein the first network node is selected from a group consisting of a Serving Gateway (SGW), a Serving General Packet Radio Service Support Node (SGSN), a Trusted Wireless Local Area Network Access Gateway (TWAG), an evolved Packet Data Gateway (ePDG), and an Access and Mobility Management Function (AMF) and wherein the second network node is selected from a group consisting of a Packet Data Network Gateway (PGW), a Gateway General Packet Radio Service Support Node (GGSN), and a Session Management Function (SMF).

25. The system of claim 16, further comprising a Traffic Detection Function (TDF) configured to offload traffic directed to the server via the CGNAT, bypassing the second network node.

26. The system of claim 25, further comprising a Call Data Records (CDR) generator configured to generate a CDR of the traffic offloaded by the TDF module toward the server.

27. The system of claim 17, wherein the Authentication System is deployed on an Internet network and is configured to communicate with the server via a Hypertext Transfer Protocol Secure (HTTPS) connection or a virtual private network (VPN) connection.

28. The system of claim 16, wherein the Identification System is deployed on the telecommunications network or an Internetwork Packet Exchange (IPX) network.

29. The system of claim 16, wherein the encrypted request from the UE to access the server is sent using a Hypertext Transfer Protocol Secure (HTTPS).

30. A method of authenticating a User Equipment (UE) requesting to access a server via a telecommunications network, comprising:

intercepting a first message sent from a first network node to a second network node, wherein the first message enables establishment of a data session for the UE, wherein the first network node is selected from a group consisting of a Serving Gateway (SGW), a Serving General Packet Radio Service Support Node (SGSN), a Trusted Wireless Local Area Network Access Gateway (TWAG), an evolved Packet Data Gateway (ePDG), and an Access and Mobility Management Function (AMF) and wherein the second network node is selected from a group consisting of a Packet Data Network Gateway (PGW), a Gateway General Packet Radio Service Support Node (GGSN), and a Session Management Function (SMF);

extracting from the first message a first set of identification values associated with the UE and storing the first set of identification values in a first database;

forwarding the first message to the second network node;

subsequent to the data session being established for the UE, receiving an encrypted request from the UE to access a server;

forwarding the encrypted request to the server, wherein responsive to receiving the encrypted request, the server obtains a second set of identification values;

receiving a validation request from the server requesting to validate the UE, wherein the validation request includes the second set of identification values associated with the UE;

comparing the second set of identification values received in the validation request from the server against the first set of identification values stored in the first database; and responsive to the second set of identification values matching the first set of identification values, sending an authentication confirmation to the server.

31. A method of authenticating a User Equipment (UE) requesting to access a server via a telecommunications network, comprising:

intercepting a first message sent from a first network node to a second network node, wherein the first message enables establishment of a data session for the UE;

extracting from the first message a first set of identification values associated with the UE and storing the first set of identification values in a first database;

forwarding the first message to the second network node;

subsequent to the data session being established for the UE, receiving an encrypted request from the UE to access a server;

forwarding the encrypted request to the server, wherein responsive to receiving the encrypted request, the server obtains a second set of identification values, wherein the second set of identification values is stored during an onboarding procedure or a Know Your Customer (KYC) procedure and is configured to be accessed by the server based on user credentials provided in the encrypted request;

receiving a validation request from the server requesting to validate the UE, wherein the validation request includes the second set of identification values associated with the UE;

comparing the second set of identification values received in the validation request from the server against the first set of identification values stored in the first database; and responsive to the second set of identification values matching the first set of identification values, sending an authentication confirmation to the server.

32. A method of authenticating a User Equipment (UE) requesting to access a server via a telecommunications network, comprising:

intercepting a first message sent from a first network node to a second network node, wherein the first message enables establishment of a data session for the UE, wherein a GPRS Tunneling Protocol (GTP) Proxy, a Hypertext Transport Protocol/2 (HTTP/2) Proxy, a Security Edge Protection Proxy (SEPP) Proxy, or a Session Management Function (SMF) Proxy is used to intercept the first message;

extracting from the first message a first set of identification values associated with the UE and storing the first set of identification values in a first database;

forwarding the first message to the second network node;

subsequent to the data session being established for the UE, receiving an encrypted request from the UE to access a server;

forwarding the encrypted request to the server, wherein responsive to receiving the encrypted request, the server obtains a second set of identification values;

receiving a validation request from the server requesting to validate the UE, wherein the validation request includes the second set of identification values associated with the UE;

comparing the second set of identification values received in the validation request from the server against the first set of identification values stored in the first database; and responsive to the second set of identification values matching the first set of identification values, sending an authentication confirmation to the server.

* * * * *